United States Patent
Gramlow

(10) Patent No.: US 8,931,573 B1
(45) Date of Patent: Jan. 13, 2015

(54) TOOLBAR IMPLEMENT

(71) Applicant: Richard A. Gramlow, Fullerton, ND (US)

(72) Inventor: Richard A. Gramlow, Fullerton, ND (US)

( * ) Notice: Subject to any disclaimer, the term of this patent is extended or adjusted under 35 U.S.C. 154(b) by 0 days.

(21) Appl. No.: 14/341,899

(22) Filed: Jul. 28, 2014

Related U.S. Application Data

(63) Continuation-in-part of application No. 13/938,318, filed on Jul. 10, 2013, now abandoned.

(60) Provisional application No. 61/679,101, filed on Aug. 3, 2012.

(51) Int. Cl.
  *A01B 73/00* (2006.01)
  *A01B 76/00* (2006.01)
  *A01B 73/06* (2006.01)

(52) U.S. Cl.
  CPC ............... *A01B 76/00* (2013.01); *A01B 73/065* (2013.01)
  USPC .......................................... 172/387; 172/311

(58) Field of Classification Search
  CPC ............................. A01B 73/065; B62D 55/08
  USPC .......................................... 172/272, 274, 387
  See application file for complete search history.

(56) References Cited

U.S. PATENT DOCUMENTS

| | | | |
|---|---|---|---|
| 4,657,099 A * | 4/1987 | Baltensperger | 180/9.28 |
| 5,687,798 A * | 11/1997 | Henry et al. | 172/311 |
| 6,354,382 B1 * | 3/2002 | Jarman et al. | 172/213 |
| 7,740,084 B2 * | 6/2010 | Rosenboom | 172/387 |
| 8,528,657 B1 * | 9/2013 | Rosenboom | 172/311 |
| 8,626,408 B1 * | 1/2014 | Satzler et al. | 701/50 |
| 2014/0262378 A1 * | 9/2014 | Connors et al. | 172/387 |

* cited by examiner

*Primary Examiner* — Thomas B Will
*Assistant Examiner* — Joel F. Mitchell
(74) *Attorney, Agent, or Firm* — Philip L. Bateman

(57) ABSTRACT

A toolbar implement connects to a tractor and a plurality of row units are connected to the toolbar implement. The toolbar implement contains: (a) a main longitudinal frame; (b) a transverse left wing toolbar hingedly connected to the frame; (c) a transverse center bar connected to the frame; (d) a transverse right wing toolbar hingedly connected to the frame; (e) a plurality of lift arms connected to the center bar; (f) an axle connected to the distal ends of the lift arms; (g) a plurality of track assemblies mounted on the axle; (h) a left longitudinal frame member connected to the center bar and extending rearwardly; (i) a right longitudinal frame member connected to the center bar and extending rearwardly; and (j) a transverse center toolbar connected to the main frame, the left longitudinal frame member, and the right longitudinal frame member.

6 Claims, 5 Drawing Sheets

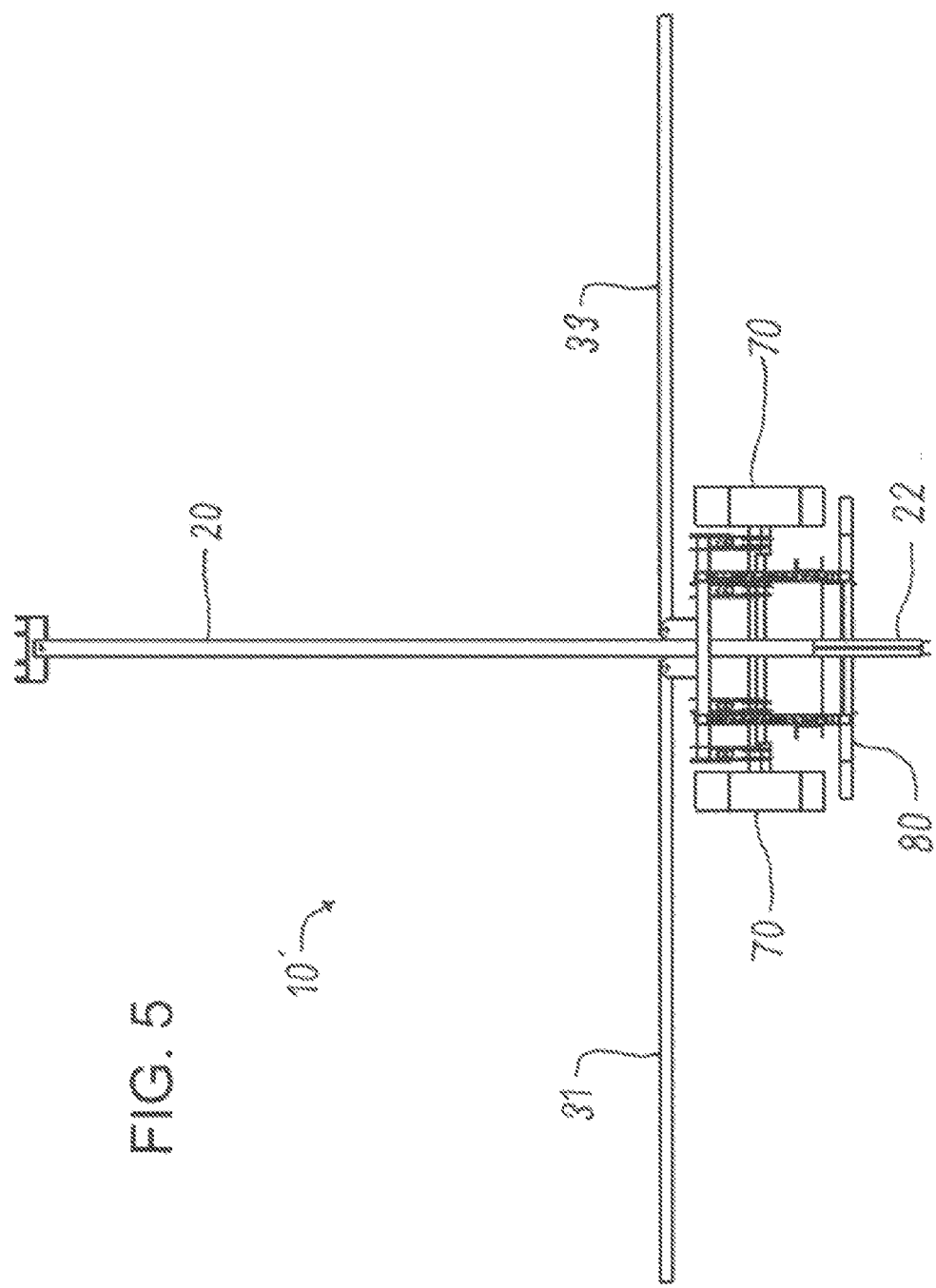

TOOLBAR IMPLEMENT

CROSS-REFERENCE TO RELATED APPLICATIONS

This application is a continuation-in-part and claims the benefit of U.S. Utility application Ser. No. 13/938,318, Jul. 10, 2013, which application claimed the benefit of U.S. Provisional Application Ser. No. 61/679,101, Aug. 3, 2012.

FIELD OF THE INVENTION

This invention relates to farming. More particularly, this invention relates to toolbar implements.

BACKGROUND OF THE INVENTION

The planting of corn, soybeans, and other crops is typically performed by driving a tractor through the field pulling a toolbar implement. The toolbar implement consists of a frame supported by wheels or tracks and having a transverse bar to which multiple planting units are attached. The planting units are spaced apart along the transverse bar to correspond to the seed rows that will be planted. The term "toolbar" is used interchangeably in the industry to refer to the implement as a whole and to the transverse bar specifically. As used herein, the term "toolbar" refers specifically to the transverse bar to which the planting units are attached and the term "toolbar implement" refers to the implement as a whole.

Toolbar implements are also used in other farming operations. For example, multi-functional row units are often attached to the toolbar implement to simultaneously till (also known as cultivate or plow), plant, and fertilize in one pass through the field. This method of farming is known as strip tillage, zone tillage, or strip till farming. As used herein, the term "row unit" refers to any type of planter, tiller, fertilizer, multi-functional unit, or the like that is attached to a toolbar implement.

Toolbar implements commonly contain toolbars that have widths of 20 feet (which can accommodate 8 planting units spaced thirty inches apart), 30 feet (which can accommodate 12 planting units spaced thirty inches apart), and more. The toolbars are so wide that they commonly are hinged so that the overall width of the implement can be reduced for storage and to travel upon public roads.

FIGS. 1 and 2 illustrate a typical wheeled toolbar implement. The implement contains a main longitudinal frame having a connector at the front and a hitch at the rear. The toolbar is divided into three sections, a hinged left wing, a fixed center, and a hinged right wing. In FIG. 1, the two wings are shown extended (the working position). In FIG. 2, the two wings are shown folded forward against the main frame (the storage and transport position). Spaced apart on the center toolbar are four wheel assemblies. Each wheel assembly contains a bracket, a motion dampener, a lift arm, and a wheel. The lift arms are hydraulic cylinders controlled by the tractor operator that can raise the frame for storage or transport. Row units are attached to the center toolbar in the spaces between the wheel assemblies.

While toolbar implements containing wheels are more common, toolbar implements containing track assemblies are becoming more popular. Track assemblies make contact with the ground with larger surface areas (footprints) and therefore reduce soil compaction and improve the ability to operate in wet fields. A toolbar implement with track assemblies is disclosed in Houck, U.S. Pat. Appln. Publn. No. 2006/0090910, May 4, 2006. The Houck implement has left and right wing toolbars that are located aft of (behind) and above the track assemblies. A track assembly for a toolbar implement is described in Rosenboom, U.S. Pat. No. 7,726,749, issued Jun. 1, 2010, incorporated by reference.

Many farmers would like to convert their wheeled toolbar implements to tracks. Unfortunately, tracks take up so much more space that interference problems usually arise. As a result, track assemblies generally cannot simply be substituted for wheels.

Accordingly, there is a demand for an improved method for converting a wheeled toolbar implement to a tracked toolbar implement. There is also a demand for an improved toolbar implement having tracks instead of wheels.

SUMMARY OF THE INVENTION

One general object of this invention is to provide an improved toolbar implement. Another general object of this invention is provide an improved method for converting a wheeled toolbar implement to a tracked toolbar implement.

I have invented an improved toolbar implement for connection to a tractor and to which a plurality of row units are connected. The toolbar implement comprises: (a) a main longitudinal frame having a connector at the front for connection to a tractor hitch; (b) a left wing toolbar hingedly connected to the frame and movable between a longitudinal folded position and a transverse working position, the left wing toolbar having an outer end; (c) a right wing toolbar hingedly connected to the frame and movable between a longitudinal folded position and a transverse working position, the right wing toolbar having an outer end with a distance between the outer end of the right wing toolbar and the outer end of the left wing toolbar defining an overall working width of the implement; (d) a transverse center bar connected to the frame and being completely aft of the left wing toolbar and the right wing toolbar; (e) a plurality of lift arms with upper proximate ends and lower distal ends, the lift arms connected at their proximate ends to the center bar; (f) an axle connected to the distal ends of the lift arms and having no direct connection to the frame so that the axle is free to move independently of the frame; (g) a plurality of track assemblies mounted on the axle, the track assemblies being completely aft of the left wing toolbar and the right wing toolbar; (h) a left longitudinal frame member connected to the center bar and extending to the aft; (i) a right longitudinal frame member connected to the center bar and extending to the aft; and (j) a transverse center toolbar connected to the main frame, the left longitudinal frame member, and the right longitudinal frame member, the center toolbar being completely aft of the track assemblies so that the track assemblies do not interfere with any row units connected to the center toolbar, and the center toolbar extending at least to the track assemblies so that row units can be connected to the toolbars of the implement at any point along the overall working width of the implement.

I have also invented an improved method for converting a wheeled toolbar implement into a tracked toolbar implement. The first step of the method is: (a) obtaining a wheeled toolbar implement comprising: (i) a main longitudinal frame having a connector at the front for connection to a tractor hitch; (ii) a left wing toolbar hingedly connected to the frame and movable between a longitudinal folded position and a transverse working position, the left wing toolbar having an outer end; (iii) a right wing toolbar hingedly connected to the frame and movable between a longitudinal folded position and a transverse working position, the right wing toolbar having an outer end with a distance between the outer end of the right wing toolbar and the outer end of the left wing toolbar defining an overall working width of the implement; (iv) a transverse center bar connected to the frame and being completely aft of the left wing toolbar and the right wing toolbar; (v) a plurality of lift arms with upper proximate ends and lower distal ends, the lift arms connected at their proximate ends to the center bar; and (vi) a plurality of wheels connected to the distal ends of the lift arms. The remaining steps of the method are: (b) connecting a main frame extension member to the main frame that extends to the aft of the main frame; (c) connecting a left longitudinal frame member to the center bar that extends to the aft; (d) connecting a right longitudinal frame member to the center bar that extends to the aft; (e) removing the wheels; (f) connecting an axle to the distal ends of the lift arms and to no other part of the frame so that the axle is free to move independently of the frame; (g) connecting a plurality of track assemblies to the axle; and (h) connecting a transverse center toolbar to the main frame extension member, the left longitudinal frame member, and the right longitudinal frame member, the center toolbar being completely aft of the track assemblies so that the track assemblies do not interfere with any row units connected to the center toolbar, and the center toolbar extending at least to the track assemblies so that row units can be connected to the toolbars of the implement at any point along the overall working width of the implement.

The toolbar implement of this invention has track assemblies that are completely aft of the left and right wing toolbars and has a center toolbar that is completely aft of the track assemblies. This arrangement enables row units to be connected at any desired position along the entire width of the implement without interference with the track assemblies.

BRIEF DESCRIPTION OF THE DRAWINGS

FIG. 5 is a top plan view thereof with the wing sections in the extended position.

DETAILED DESCRIPTION OF THE INVENTION

Figure 1:
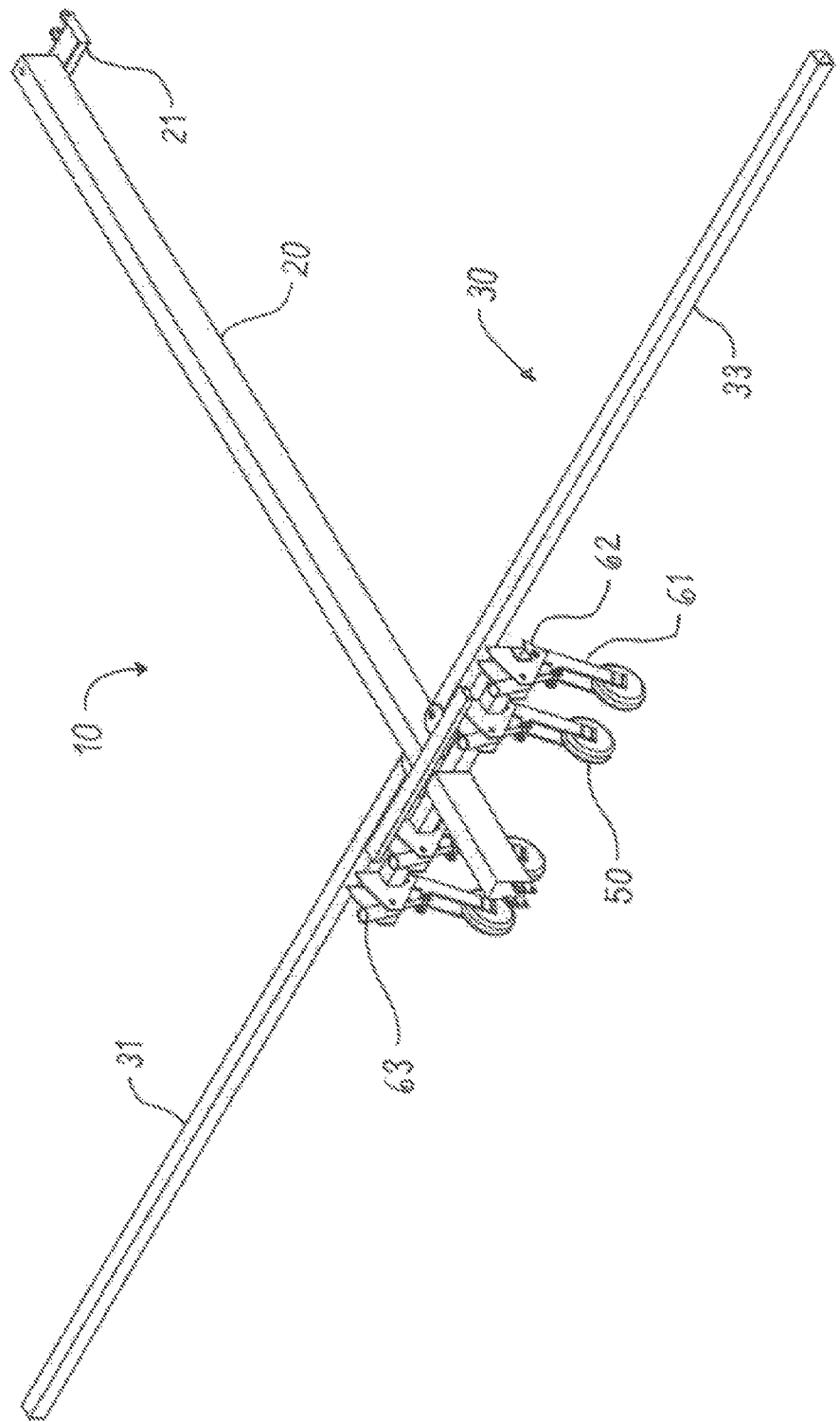
FIG. 1 is a top, rear, and right side elevation view of a prior art toolbar implement with the wing sections in the extended position.
Figure 2:
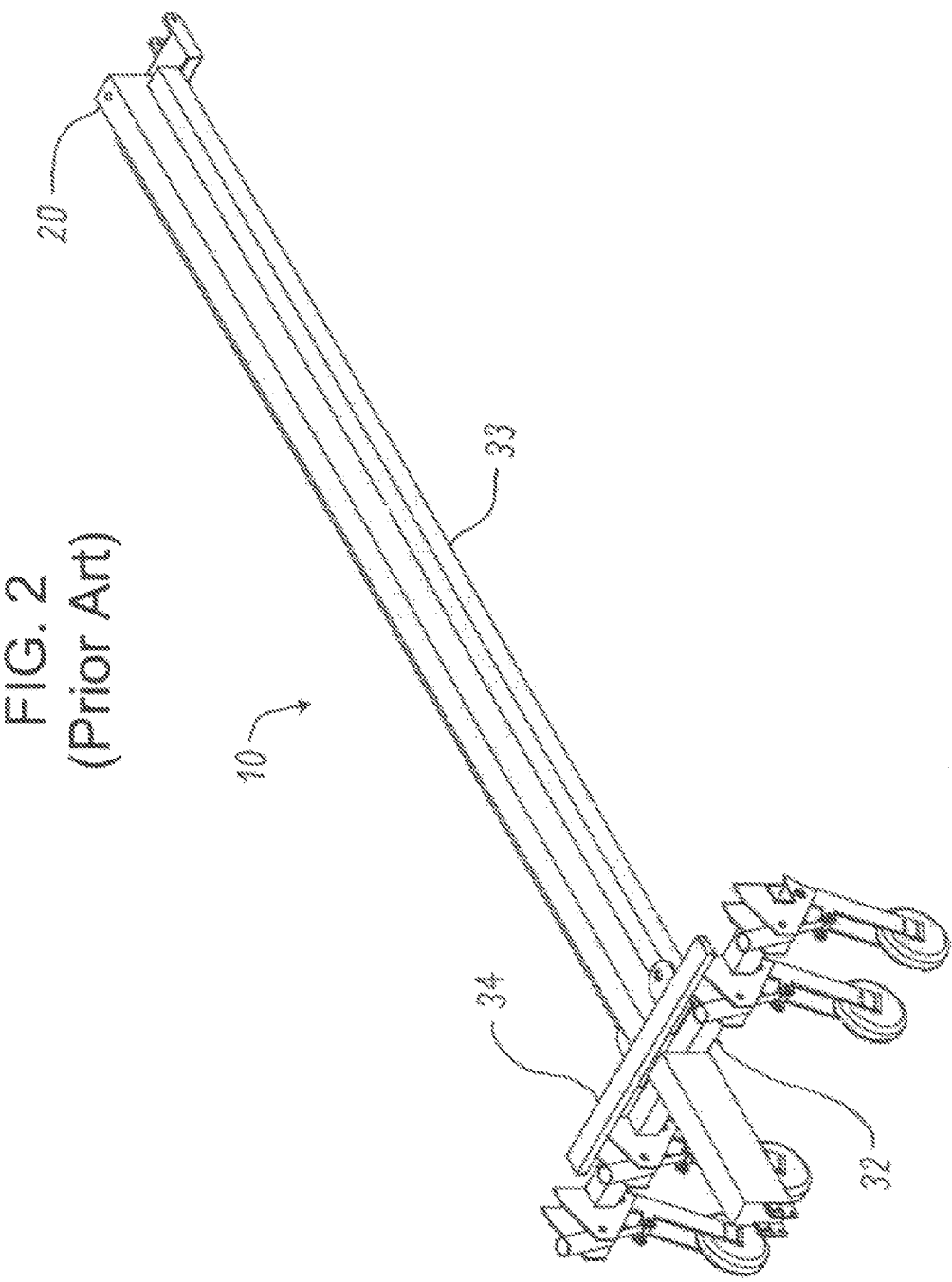
FIG. 2 is a top, rear, and right side elevation view thereof with the wing sections in the folded position.

This invention is best understood by reference to the drawings. Referring first to FIGS. 1 and 2, many farmers currently own a wheeled toolbar implement 10 having a main frame 20 and a transverse toolbar 30. The main frame defines a longitudinal axis. The toolbar is divided into three sections, a hinged transverse left wing 31, a fixed transverse center 32, and a hinged transverse right wing 33. The wing toolbars are shown in their transverse working positions in FIG. 1 and in their longitudinal folded (storage and transport) position in FIG. 2. Many of the farmers owning such wheeled toolbar implements would like to remove the wheels 50 and replace them with track assemblies. However, track assemblies are much bulkier than wheels so a simple substitution of a track assembly for a wheel is not possible. The method of this invention converts a wheeled toolbar implement to a tracked implement efficiently and effectively. The tracked implement can be constructed as a new item ("from scratch") without first constructing the wheeled implement, but in most cases the tracked implement is constructed by converting an existing wheeled implement.

Figure 3:
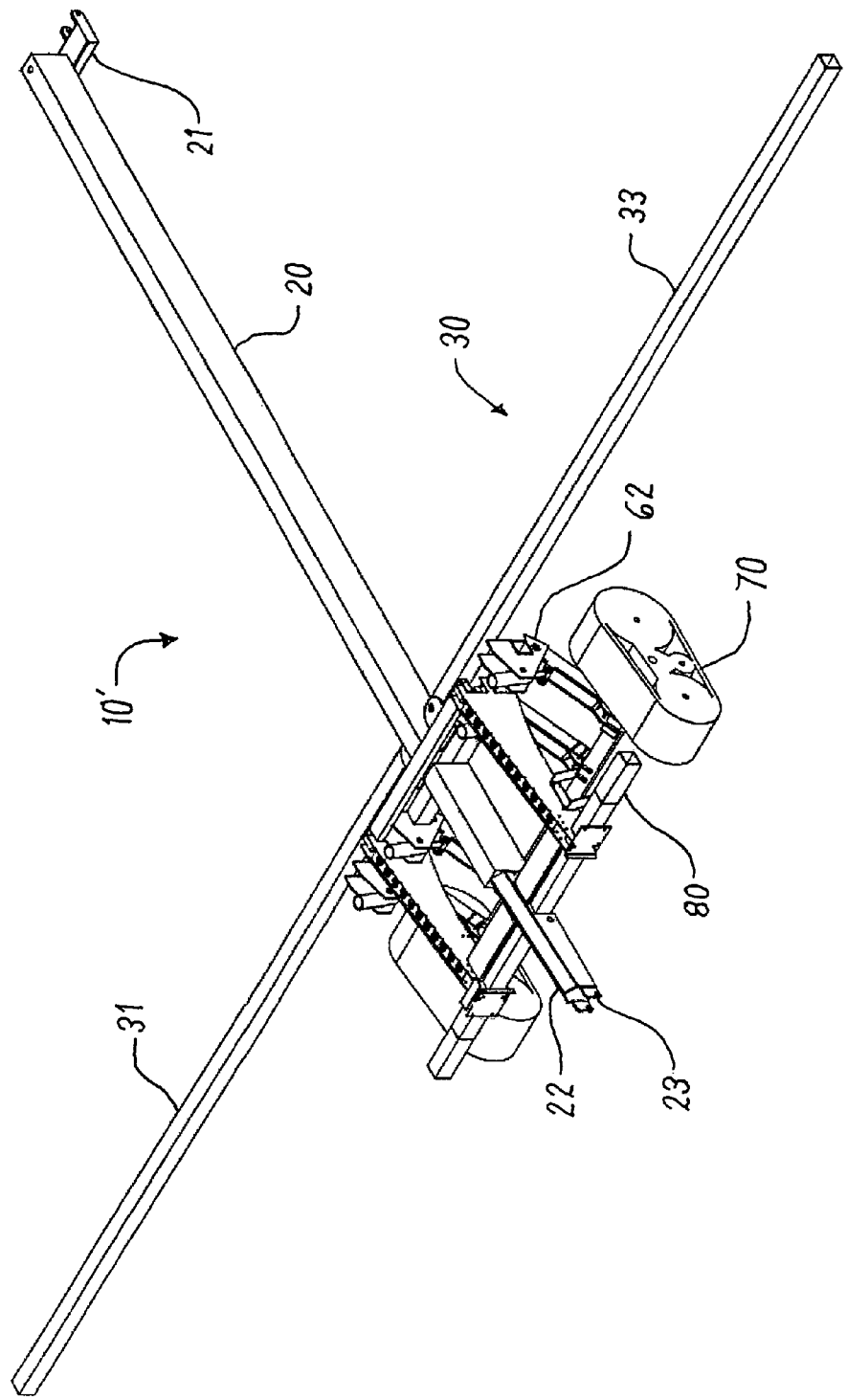
FIG. 3 is a top, rear, and right side elevation view of a preferred embodiment of the toolbar implement of this invention with the wing sections in the extended position.
Figure 4:
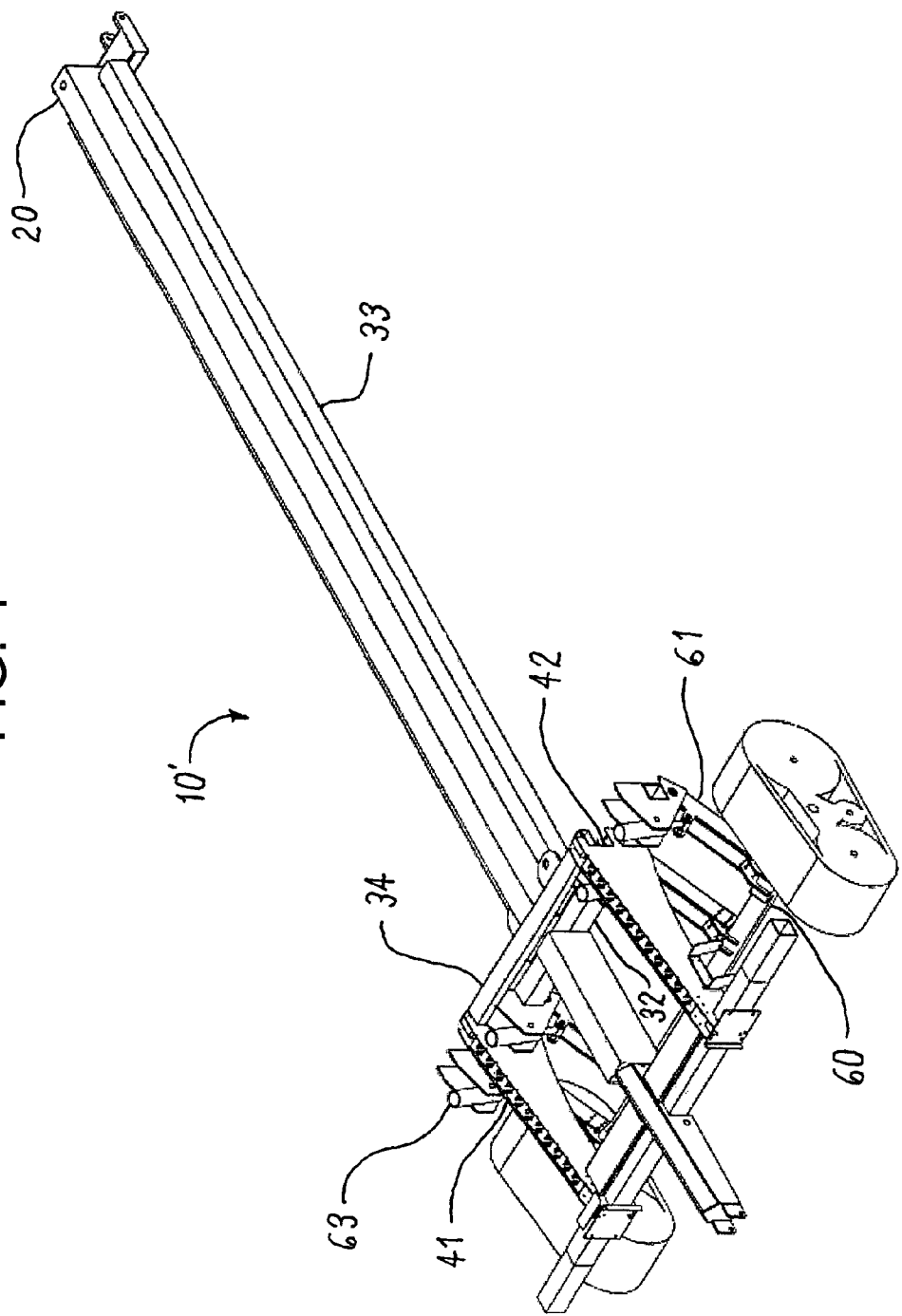
FIG. 4 is a top, rear, and right side elevation view thereof with the wing sections in the folded position.

Referring now to FIGS. 3 and 4, the converted tracked toolbar implement 10' still contains the main frame 20, the left wing toolbar 31 and the right wing toolbar 33. The transverse center bar 32 originally functioned as a toolbar. After conversion, it functions only as a frame member and its toolbar function is performed by a new transverse center toolbar 80. In FIG. 3, the implement is shown with the wing toolbars extended in the working position. In FIG. 4, the implement is shown with the wing toolbars folded in the storage and transport position.

The first step of the conversion is to modify the main longitudinal frame 20 having a connector 21 at the front for connection to a trailer hitch (not shown) by connecting a rearwardly extending main frame extension member 22 to the main frame. The extension preferably includes a hitch 23 at the rear for connection of an auxiliary implement such as a tank.

The next step of the conversion is to connect a left longitudinal frame member 41 and a right longitudinal frame member 42 to the center bar 32. As discussed in detail below, the frame members extend rearwardly a sufficient distance that the new center toolbar is completely aft of the track assemblies. In the embodiment shown, the left and right longitudinal frame members are also connected to an upper transverse frame member 34 for additional stability. In the embodiment shown, the left and right longitudinal frame members are made of parallel sheets of steel plate with trusses sandwiched in between.

The next step of the conversion is to remove the wheels 50 and replace them with an axle 60. The axle is thus connected to the distal ends of all the lift arms 61. The upper, proximate ends of the lift arms are connected to brackets 62 that are, in turn, connected to the center bar. Motion dampeners 63 extend between the brackets and the lift arms.

The next step of the conversion is to attach two or more track assemblies 70 to the axle. As best seen in FIG. 5, the track assemblies are completely aft of the left and right wing toolbars. A preferred track assembly is disclosed in the Rosenboom patent previously mentioned.

The final step of the conversion is to connect a new, transverse center toolbar 80 to the main frame extension member, the left longitudinal frame member, and the right longitudinal frame member. The center toolbar is located aft of the track assemblies so they do not interfere with the center toolbar or with any row units connected to the center toolbar. The center toolbar preferably has a width that is at least equal to the distance between inner sides of the outer track assemblies (i.e., the center toolbar extends at least to the outer pair of track assemblies) so that row units can be connected at any desired positions across the three sections of toolbars (i.e., the overall working width of the toolbar implement) without interference. If desired, the center toolbar extends slightly past the outer sides of the outer track assemblies.

With the conversion complete, row units are connected to the toolbar sections as desired and the toolbar implement is ready for use. The track assemblies make contact with the ground with larger surface areas (footprints) than wheels and therefore reduce soil compaction and improve the ability to operate in wet fields.

I claim:

1. A toolbar implement for connection to a tractor and to which a plurality of row units are connected, the toolbar implement comprising:

(a) a longitudinal main frame having a front connector for connection to a tractor hitch;

(b) a left wing toolbar hingedly connected to the main frame and movable between a longitudinal folded position and a transverse working position, the left wing toolbar having an outer end;

(c) a right wing toolbar hingedly connected to the main frame and movable between a longitudinal folded position and a transverse working position, the right wing toolbar having an outer end with a distance between the outer end of the right wing toolbar and the outer end of the left wing toolbar defining an overall working width of the toolbar implement;

(d) a transverse center bar connected to the main frame and being completely aft of the left wing toolbar and the right wing toolbar;

(e) a plurality of lift arms with upper proximate ends and lower distal ends, the lift arms connected at their proximate ends to the center bar;

(f) an axle connected to the distal ends of the lift arms and having no direct connection to the main frame so that the axle is free to move independently of the main frame;

(g) a plurality of track assemblies mounted on the axle, the track assemblies being completely aft of the left wing toolbar and the right wing toolbar;

(h) a left longitudinal frame member connected to the center bar and extending aftward of the center bar;

(i) a right longitudinal frame member connected to the center bar and extending aftward of the center bar; and (j) a transverse center toolbar connected to the main frame, the left longitudinal frame member, and the right longitudinal frame member, the center toolbar being completely aft of the track assemblies so that the track assemblies do not interfere with any row units connected to the center toolbar, and the center toolbar extending at least to the track assemblies so that row units can be connected to the left wing toolbar, the right wing toolbar, and the center toolbar at any point along the overall working width of the toolbar implement.

2. The toolbar implement of claim 1 comprising two and only two track assemblies.

3. The toolbar implement of claim 1 additionally comprising a transverse frame member positioned above the center bar and connected to the left longitudinal frame member and the right longitudinal frame member.

4. A method for converting a wheeled toolbar implement into a tracked toolbar implement, the method comprising:

(a) obtaining a wheeled toolbar implement comprising: (i) a longitudinal main frame having a front connector for connection to a tractor hitch; (ii) a left wing toolbar hingedly connected to the main frame and movable between a longitudinal folded position and a transverse working position, the left wing toolbar having an outer end; (iii) a right wing toolbar hingedly connected to the main frame and movable between a longitudinal folded position and a transverse working position, the right wing toolbar having an outer end with a distance between the outer end of the right wing toolbar and the outer end of the left wing toolbar defining an overall working width of the toolbar implement; (iv) a transverse center bar connected to the main frame and being completely aft of the left wing toolbar and the right wing toolbar; (v) a plurality of lift arms with upper proximate ends and lower distal ends, the lift arms connected at their proximate ends to the center bar; and (vi) a plurality of wheels connected to the distal ends of the lift arms;

(b) connecting a main frame extension member to the main frame that extends aftward of the main frame;

(c) connecting a left longitudinal frame member to the center bar that extends aftward of the center bar;

(d) connecting a right longitudinal frame member to the center bar that extends aftward of the center bar;

(e) removing the wheels;

(f) connecting an axle to the distal ends of the lift arms and to no other part of the main frame so that the axle is free to move independently of the main frame;

(g) connecting a plurality of track assemblies to the axle such that the track assemblies are completely aft of the left wing toolbar and the right wing toolbar; and (h) connecting a transverse center toolbar to the main frame extension member, the left longitudinal frame member, and the right longitudinal frame member, the center toolbar being completely aft of the track assemblies so that the track assemblies do not interfere with any row units connected to the center toolbar, and the center toolbar extending at least to the track assemblies so that row units can be connected to the left wing toolbar, the right wing toolbar, and the center toolbar at any point along the overall working width of the toolbar implement, and to thereby create a tracked toolbar implement.

5. The method of claim 4 comprising two and only two track assemblies.

6. The method of claim 4 wherein the tracked toolbar implement additionally comprises a transverse frame member positioned above the center bar and connected to the left longitudinal frame member and the right longitudinal frame member.

* * * * *